(12) United States Patent
Maric et al.

(10) Patent No.: US 8,495,820 B2
(45) Date of Patent: Jul. 30, 2013

(54) ANGLE-MEASURING DEVICE

(75) Inventors: Zlatko Maric, Traunstein (DE); Volker Hoefer, Palling (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 371 days.

(21) Appl. No.: 13/119,921

(22) PCT Filed: Jul. 14, 2009

(86) PCT No.: PCT/EP2009/058991
§ 371 (c)(1),
(2), (4) Date: Mar. 18, 2011

(87) PCT Pub. No.: WO2010/031608
PCT Pub. Date: Mar. 25, 2010

(65) Prior Publication Data
US 2011/0167659 A1    Jul. 14, 2011

(30) Foreign Application Priority Data
Sep. 20, 2008 (DE) .......................... 10 2008 048 140

(51) Int. Cl.
*G01B 21/22* (2006.01)
*G01D 11/24* (2006.01)

(52) U.S. Cl.
USPC .................................. 33/1 N; 33/706; 33/707

(58) Field of Classification Search
USPC .................. 33/1 N, 1 PT, 703, 704, 705, 706, 33/707, 708
See application file for complete search history.

(56) References Cited

U.S. PATENT DOCUMENTS

| | | | | |
|---|---|---|---|---|
| 3,583,815 A | * | 6/1971 | Kersey, Jr. | 356/150 |
| 4,377,036 A | * | 3/1983 | Dangschat | 33/705 |
| 5,319,577 A | * | 6/1994 | Lee | 702/153 |
| 5,852,413 A | | 12/1998 | Bacchi et al. | |

FOREIGN PATENT DOCUMENTS

WO    2005/010940    3/2005

OTHER PUBLICATIONS

International Search Report, issued in corresponding International Application No. PCT/EP2009/058991, Mar. 18, 2010, 5 pages.

* cited by examiner

*Primary Examiner* — R. A. Smith
(74) *Attorney, Agent, or Firm* — Kenyon & Kenyon LLP

(57) ABSTRACT

An angle-measuring device including a first component group and a second component group, the component groups being disposed in a manner allowing rotation relative to each other by a bearing. The first component group includes a housing having a connecting device, as well as a scanning unit. The second component group includes a shaft to which a code disk is attached, and a flow channel having a directional component parallel to the axis. The angle-measuring device is configured such that a negative pressure is able to be applied to the connecting device, so that a fluid surrounding the angle-measuring device with a pressure flows through the angle-measuring device to remove contaminants by suction. At the applied negative pressure, a first mass flow of the fluid which flows through the flow channel is greater than a second mass flow which flows through the bearing gap.

10 Claims, 3 Drawing Sheets

ANGLE-MEASURING DEVICE

FIELD OF THE INVENTION

The present invention relates to an angle-measuring device for determining relative angular positions.

BACKGROUND INFORMATION

Such angle-measuring devices are often used for determining the angular position of two machine parts rotatable relative to each other and, for example, operate according to an optical measuring principle. For instance, a rotor of a wafer-inspection system is considered as a rotatable machine part. Such systems are usually operated in clean rooms.

PCT International Published Patent Application No. WO 2005/010940 describes such a wafer-inspection system, which has vacuum connections for removing contaminants by suction. The system also includes an angle-measuring device.

SUMMARY

Example embodiments of the present invention provide an improved angle-measuring device, which is also operable in surroundings having high requirements with respect to air purity.

Accordingly, the angle-measuring device includes a first component group and a second component group, the two component groups being disposed in a manner allowing rotation relative to each other about an axis by a bearing having a bearing gap. The first component group includes a housing having a connecting device, as well as a scanning unit. The second component group includes a shaft to which a code disk is attached, as well as a flow channel which extends with a directional component parallel to the axis. The code disk is scannable by the scanning unit in order to determine the angular position of the two component groups relative to each other. Moreover, the angle-measuring device is configured such that a negative pressure is able to be applied to the connecting device, so that a fluid surrounding the angle-measuring device with a pressure, flows through the angle-measuring device to remove contaminants by suction, and at the applied negative pressure, a first mass flow of the fluid which flows through the flow channel is greater than a second mass flow which flows through the bearing gap.

Often, the fluid surrounding the angle-measuring device is air, so that, for example, the angle-measuring device is able to be traversed by air. The suction is especially intended to keep the area surrounding the angle-measuring device free of contaminants.

In example embodiments of the present invention, the bearing takes the form of a roller bearing. The bearing advantageously has a seal which, in particular, may be implemented as a non-contact seal. The seal is used to limit the second mass flow, which flows through the bearing gap. For instance, the non-contact seal may be implemented as a narrow gap and/or as a flow deflection, especially as a multiple flow deflection. A non-contact seal makes it possible to achieve sufficient sealing action, without contaminants in the form of abrasion particles being produced by the seal.

If the bearing is in the form of a roller bearing and has a non-contact seal to limit the second mass flow which flows through the bearing gap, the seal may be formed by a gap and/or a flow deflection. The gap and/or the flow deflection may be bounded by surfaces which are assigned to components that at the same time have bearing surfaces for rolling elements.

In particular, the radial distance in the area of the bearing between the respective components of the two component groups (rotor and stator) is to be understood as bearing gap. If the bearing is in the form of a roller bearing, the bearing gap may be viewed as the radial distance between the bearing rings, thus, the bodies which have bearing surfaces for corresponding rolling elements.

Moreover, the shaft may have an axial flow channel which, in particular, may be implemented as a bore hole, fluid being able to flow through the flow channel in response to the applied negative pressure.

The two component groups may have components which are set apart from each other by a gap, a mass flow being guided through this gap, and this mass flow being the sum of the first mass flow and the second mass flow.

In example embodiments of the present invention, the angle-measuring device may have a fluid guideway which is able to be traversed by the fluid, and which conducts the fluid with a radial directional component along the bearing. Accordingly, the fluid guideway may be implemented such that the first mass flow is conducted with a radial directional component along the bearing. In this manner, it may be ensured that particles which come from the bearing leave the angle-measuring device only by the suction.

Moreover, the fluid guideway may include a plurality of recesses in a component of the first or of the second component group, or alternatively, in components of both component groups. In this case, the fluid guideway is thus realized by recesses. In particular, it is advantageous if the fluid guideway includes a plurality of recesses in one component. Advantageously, the recesses are introduced only into one of the components. Furthermore, the component in which the recesses are introduced is advantageously assigned to the second component group.

Further advantages of the angle-measuring device and details pertaining thereto are described below in the following description of exemplary embodiments, with reference to the attached Figures.

DETAILED DESCRIPTION

Figure 1:
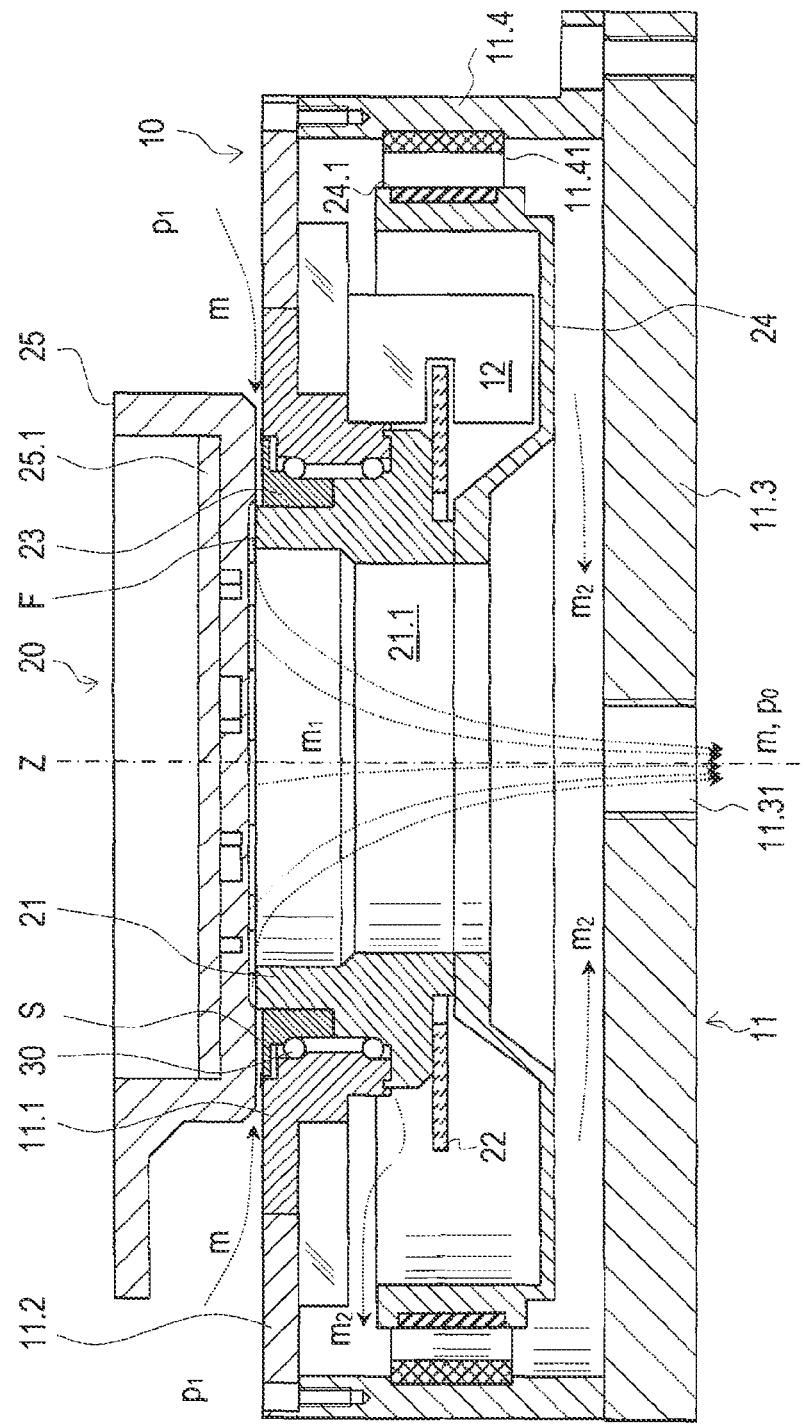
FIG. 1 is a cross-sectional view through an angle-measuring device.

FIG. 1 is a cross-sectional view through an angle-measuring device according to an exemplary embodiment. According to this, the angle-measuring device includes a first component group, here in the function of a stator 10, and a second component group functioning as a rotor 20 in the exemplary embodiment. Rotor 20 and stator 10 are disposed in a manner allowing rotation relative to each other about an axis Z in a measuring operation.

Stator 10 includes a multipart housing 11 which is made up, inter alia, of a bearing ring 11.1, an upper housing cover 11.2, a bottom housing flange 11.3 and a housing ring 11.4. Housing ring 11.4 may be viewed as a stator-side part of an electric drive, windings 11.41 being disposed on it. In addition, two bearing surfaces for the guidance of rolling elements 30, here in the form of balls, are introduced on bearing ring 11.1.

In housing flange 11.3, a bore hole 11.31 having an internal thread is provided, which is used as a connecting device, and to which a negative pressure $p_0$ is able to be applied, e.g., with the aid of a pipe or tube.

In the exemplary embodiment illustrated, the angle-measuring device operates according to an optical measuring principle. Accordingly, additionally disposed on stator 10 is a scanning unit 12 in the form of a scanning head which is connected in torsionally fixed fashion to housing 11.

In the exemplary embodiment, rotor 20 includes a shaft that has a centric, axial bore hole 21.1 parallel to axis Z, and thus is in the form of a hollow shaft 21. Bore hole 21.1 is used here as a flow channel. A code disk 22 is attached in torsionally fixed manner to hollow shaft 21. In the exemplary embodiment, code disk 22 is made of glass, on which a line coding is applied. The line coding may be provided either as an incremental scaling and/or as an absolute graduation.

Code disk 22 is situated opposite non-rotatable scanning unit 12. Scanning unit 12 is made up of a light source which, for example, is in the form of an LED, a condenser lens and a scale segment, as well as photodetectors for receiving the modulated light beams. The photodetectors convert the light signals into position-dependent, electrical signals.

An inner bearing ring 23 is also attached to hollow shaft 21. Both inner bearing ring 23 and hollow shaft 21 have an extremely precisely machined bearing surface for the guidance of rolling elements 30. Also attached to hollow shaft 21 is a body 24, which is used as a secondary part of the electric drive, and at whose periphery permanent magnets are disposed. In addition, a rotor flange 25 in which a sealing washer 25.1 is disposed is affixed to hollow shaft 21.

Figure 2:
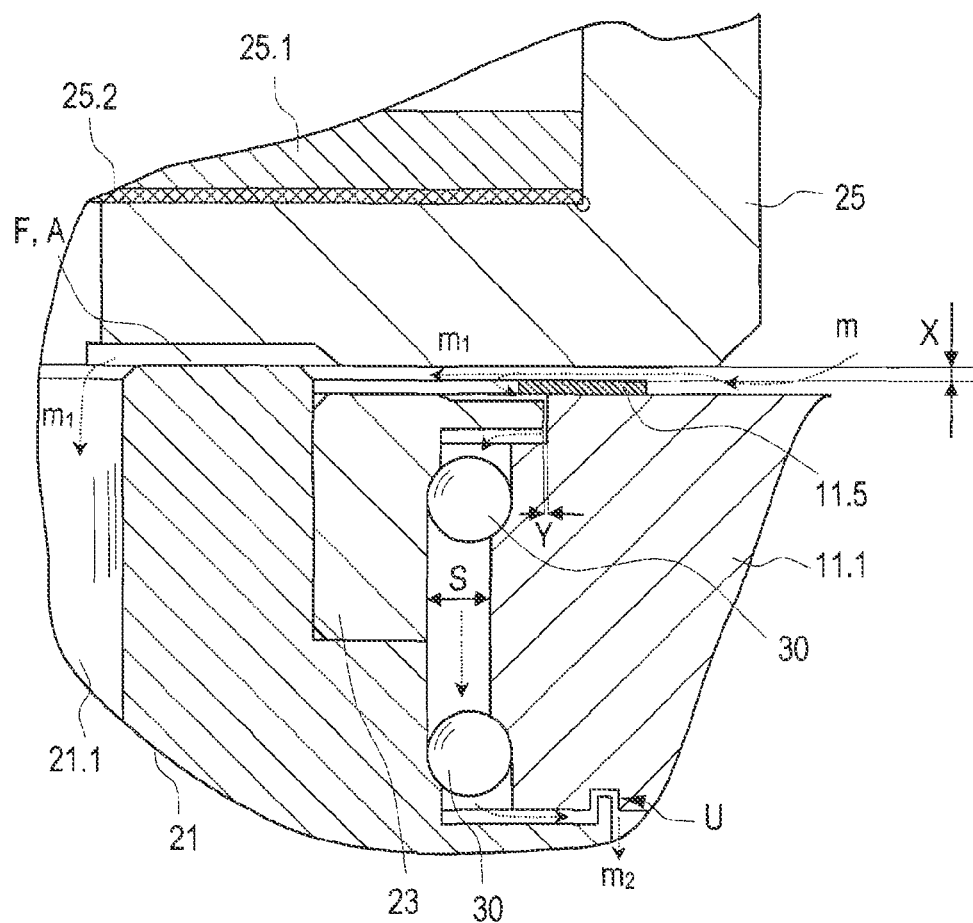
FIG. 2 is an enlarged cross-sectional view of the view according to FIG. 1.

According to FIG. 2, sealing washer 25.1 is disposed sealingly on rotor flange 25 with the aid of an adhesive layer 25.2. As is apparent from FIG. 2, in addition, a ring 11.5 is secured on upper housing cover 11.2.

Figure 3:
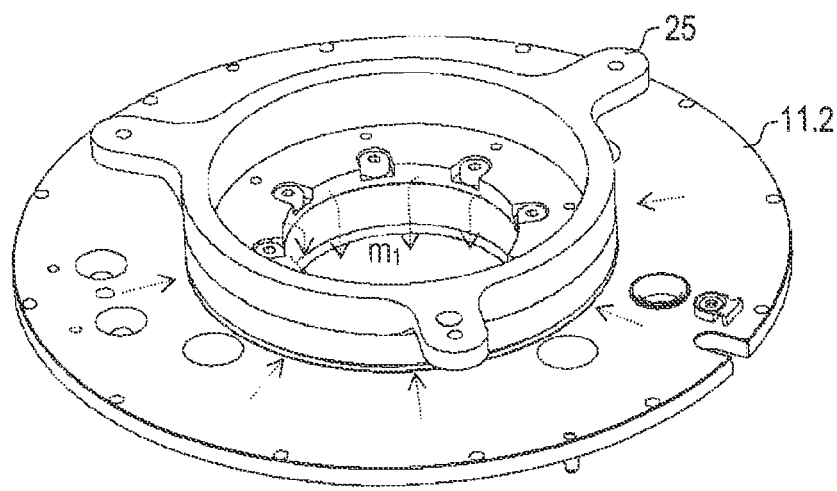
FIG. 3 is a perspective view of a rotor flange and a stator cover of the angle-measuring device.

FIG. 3 gives a perspective view of upper housing cover 11.2 with rotor flange 25, without sealing washer 25.1.

During operation of the angle-measuring device, which, in the exemplary embodiment shown, is part of a wafer-inspection system, a wafer to be examined is fastened on rotor flange 25. The actual pivoting angle of hollow shaft 21 is measured by scanning unit 12 in cooperation with code disk 22. Pivoting motions may be produced by suitable energizing of windings 11.41. Upon applying negative pressure $p_0$ to bore hole 11.31 of housing flange 11.3, air is sucked off with a mass flow m. Mass flow m is made up of a first mass flow $m_1$ and a second mass flow $m_2$. Sucked-off mass flow m is intended to ensure that no contaminants are present in the area of the wafer to be examined. Accordingly, mass flow m or the associated volumetric flow must not drop below a predefined minimum value.

Sucked-off mass flow m corresponds to the mass flow as it passes into the angle-measuring device. The air surrounding the angle-measuring device has the pressure $p_1$, which is greater than $p_0$. Accordingly, air with mass flow m streams into the gap between rotor flange 25 and upper housing cover 11.2, and as a result, passes through a narrow spot in the form of gap X between a ring 11.5 and rotor flange 25. After that, sucked-in mass flow m splits up into first mass flow $m_1$ and second mass flow $m_2$, first mass flow $m_1$ being substantially greater than second mass flow $m_2$.

First mass flow $m_1$ is conducted through a fluid guideway F in the radial direction, fluid guideway F being formed by a plurality of radial recesses A in rotor flange 25. First mass flow $m_1$ thereupon flows through axial bore hole 21.1 of hollow shaft 21.

Due to the type of construction of the angle-measuring device described, hollow shaft 21, inner bearing ring 23, rolling elements 30 and outer bearing ring 11.1 form a bearing having a bearing gap S. This bearing, i.e., here, a roller bearing, has a special design which differs from standardized bearings, those components, namely, hollow shaft 21, inner bearing ring 23 and outer bearing ring 11.1 having both bearing surfaces for rolling elements 30, and surfaces which—as explained below—are used to restrict mass flow $m_2$, which flows through the bearing This type of construction for the bearing is especially advantageous, because the number of bearing components to be machined extremely precisely is able to be reduced to a minimum.

Second mass flow $m_2$ initially passes through between inner bearing ring 23 and upper housing cover 11.2 (past rolling elements 30). In this context, the flow guidance, particularly narrow gap Y, limits second mass flow $m_2$ considerably; in addition, the flow resistance is increased by a narrow flow deflection U at the outlet of the bearing. In the exemplary embodiment shown, the width of gap Y is merely 30 μm, so that second mass flow $m_2$ is very slight, and in principle, is negligibly small in relation to first mass flow $m_1$. In this manner, lubricant which is in the area of rolling elements 30 is prevented from being sucked off in significant quantity from the bearing by the suction process. Otherwise, on the one hand, this would have the disadvantage that the synchronism of the bearing would be disturbed as the quantity of lubricant decreases; on the other hand, the optical measuring device would become contaminated by the discharged lubricant. Therefore, narrow gap Y and labyrinth-like flow deflection U between bearing ring 23 and hollow shaft 21 are used as a seal, particularly as a labyrinth seal for limiting second mass flow $m_2$.

The angle-measuring device is thus configured such that the air surrounding the angle-measuring device with pressure $p_1$ flows through the angle-measuring device to remove contaminants by suction. First of all, recesses A produce an air or fluid guideway F which exhibits a comparatively small pressure loss or flow resistance. On the other hand, due to the special construction of the angle-measuring device, second mass flow $m_2$ of the air which takes the other path and flows through bearing gap S is relatively small, and smaller by far than first mass flow $m_1$ which flows through bore hole 21.1. Therefore, the pressure loss or flow resistance is thus substantially greater for second mass flow $m_2$ than for first mass flow $m_1$. The construction of the angle-measuring device described ensures that no contaminants are able to escape from the angle-measuring device; in particular, no contaminants, e.g., abrasion particles, are able to escape from the bearing and contaminate the wafer, for example.

What is claimed is:
1. An angle-measuring device, comprising:
a first component group including a connecting device and a scanning unit;
a second component group including a shaft, a code disk attached to the shaft, and a flow channel having a directional component parallel to an axis; and
a bearing having a bearing gap, the component groups rotatable relative to each other about the axis by the bearing;
wherein the code disk is scannable by the scanning unit to determine an angular position of the two component groups relative to each other;

wherein the connecting device is adapted to be applied with a negative pressure so that a fluid surrounding the angle-measuring device flows through the angle-measuring device to remove contaminants by suction; and wherein at the applied negative pressure, a first mass flow of the fluid which flows through the flow channel is greater than a second mass flow which flows through the bearing gap.

2. The angle-measuring device according to claim 1, wherein the bearing is arranged as a roller bearing.

3. The angle-measuring device according to claim 1, wherein the bearing includes a seal adapted to limit the second mass flow which flows through the bearing gap.

4. The angle-measuring device according to claim 3, wherein the seal is arranged as a non-contact seal.

5. The angle-measuring device according to claim 1, wherein the bearing is arranged as a roller bearing having rolling elements and includes a non contact seal adapted to limit the second mass flow which flows through the bearing gap, the seal being formed by at least one of (a) a second gap and (b) a flow deflection, the at least one of (a) the second gap and (b) the flow deflection being bounded by surfaces which are assigned to components that also have bearing surfaces for the rolling elements.

6. The angle-measuring device according to claim 1, wherein the shaft has the flow channel which is traversed by the fluid in response to the applied negative pressure.

7. The angle-measuring device according to claim 1, wherein the first component group and the second component group each have components set apart from each other by a second gap, a third mass flow being guided through the second gap, the third mass flow being the sum of the first mass flow and the second mass flow.

8. The angle-measuring device according to claim 1, further comprising a fluid guideway traversable by the fluid and adapted to conduct the fluid with a radial directional component.

9. The angle-measuring device according to claim 8, wherein the fluid guideway includes a plurality of recesses in one component of at least one of (a) the first component group and (b) the second component group.

10. The angle-measuring device according to claim 8, wherein the fluid guideway includes a plurality of recesses in the second component group.

* * * * *